United States Patent
Wilczynski et al.

(10) Patent No.: US 11,178,203 B2
(45) Date of Patent: Nov. 16, 2021

(54) SYSTEMS AND METHODS FOR PROVIDING REAL-TIME STREAMING DATA PROCESSING AT EDGE SERVERS

(71) Applicant: Palantir Technologies Inc., Denver, CO (US)

(72) Inventors: Peter Wilczynski, San Francisco, CA (US); Daniel Zangri, San Francisco, CO (US); Jeffrey Martin, New York, NY (US); Robert Imig, Austin, TX (US); Wenshuai Hou, Arlington, VA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/019,561

(22) Filed: Sep. 14, 2020

(65) Prior Publication Data
US 2021/0058440 A1    Feb. 25, 2021

Related U.S. Application Data (63) Continuation of application No. 16/573,434, filed on Sep. 17, 2019, now Pat. No. 10,805,374.
(Continued)

(51) Int. Cl.
*H04L 29/06* (2006.01)
*H04W 4/021* (2018.01)
(Continued)

(52) U.S. Cl.
CPC ........ *H04L 65/605* (2013.01); *H04L 65/4069* (2013.01); *H04L 67/289* (2013.01); *H04W 4/021* (2013.01); *H04W 4/029* (2018.02)

(58) Field of Classification Search
CPC . H04L 65/605; H04L 65/4069; H04L 67/289; H04W 4/021; H04W 4/18; H04W 4/029
See application file for complete search history.

(56) References Cited

U.S. PATENT DOCUMENTS

| | | |
|---|---|---|
| 10,805,374 B1 | 10/2020 | Wilczynski et al. |
| 2016/0049014 A1 | 2/2016 | Wells et al. |

(Continued)

FOREIGN PATENT DOCUMENTS

EP    3522497 A1    8/2019

OTHER PUBLICATIONS

T. Qiu, J. Chi, X. Zhou, Z. Ning, M. Atiquzzaman and D. O. Wu, "Edge Computing in Industrial Internet of Things: Architecture, Advances and Challenges," in IEEE Communications Surveys & Tutorials, vol. 22, No. 4, pp. 2462-2488. (Year: 2020).*
(Continued)

*Primary Examiner* — John M Macilwinen
(74) *Attorney, Agent, or Firm* — Faegre Drinker Biddle & Reath LLP (57) ABSTRACT

Systems and methods provide synchronizing edge server code among a plurality of edge servers. Systems and methods provision, to a plurality of edge servers, an updated version of transform code adapted to perform real-time processing on real-time streaming data that are received by the plurality of edge servers, receive real-time transformed data from at least one of the plurality of edge servers, detect that the received real-time transformed data from the at least one of the plurality of edge servers was generated using a previous version of transform code and perform one or more transform operations corresponding to the updated version of transform code on the received real-time transformed
(Continued)

data, until the received transformed data is in a form consistent with the updated version of provisioned transform code.

15 Claims, 5 Drawing Sheets

Related U.S. Application Data (60) Provisional application No. 62/888,629, filed on Aug. 19, 2019.

(51) Int. Cl.
*H04W 4/029* (2018.01)
*H04L 29/08* (2006.01)

(56) References Cited

U.S. PATENT DOCUMENTS

| | | | |
|---|---|---|---|
| 2020/0027033 A1* | 1/2020 | Garg | H04L 67/34 |
| 2020/0244723 A1* | 7/2020 | Khalid | G06F 9/5072 |
| 2020/0344297 A1* | 10/2020 | Agarwal | H04L 67/2842 |
| 2021/0117859 A1* | 4/2021 | Rogers | H04L 41/0859 |

OTHER PUBLICATIONS

N. Hassan, S. Gillani, E. Ahmed, I. Yaqoob and M. Imran, "The Role of Edge Computing in Internet of Things," in IEEE Communications Magazine, vol. 56, No. 11, pp. 110-115. (Year: 2018).*

S. Dasgupta, A. Bagchi, and A. Gupta, "Ingesting High-Velocity Streaming Graphs from Social Media Sources". arXiv:1905.08337. pp. 1-11. (Year: 2019).*

Ai, Y. et al. "Edge computing technologies for Internet of Things: a primer." Digital Communications and Networks 4: pp. 77-86. (Year: 2017).*

* cited by examiner

SYSTEMS AND METHODS FOR PROVIDING REAL-TIME STREAMING DATA PROCESSING AT EDGE SERVERS

1. CROSS REFERENCE TO RELATED APPLICATIONS

This application is a continuation of U.S. patent application Ser. No. 16/573,434, filed on Sep. 17, 2019, which claims priority to U.S. Provisional Application No. 62/888,629, filed Aug. 19, 2019, both of which are incorporated by reference herein for all purposes.

2. BACKGROUND

Certain embodiments of the present invention are directed to systems and methods for providing real-time processing of data for client devices using a network of servers. More particularly, some embodiments of the present invention provide systems and methods for providing real-time streaming data processing at edge servers.

Current implementations of edge servers (e.g., edge nodes) in networks collect real-time streaming data, such as device global positioning system (GPS) information, from client devices, locally perform some real-time processing (e.g., transforms) on the streaming data (e.g., inner loop processing) and send the real-time processed data out through the network to a central server (e.g., data center or fixed site) for storage and further processing (e.g., outer loop processing). When one client device on the same edge server wants real-time information about another client that is using the same edge server, the processed data is sent back from the central server, down through the network and back out of the edge server. This process causes latencies that can cause real-time streaming data to be lost or late in arriving to client devices that require display or further use of the real-time streaming data from other clients that are local to the edge server. Such processes also increase bandwidth in the network.

Hence it is highly desirable to improve real-time processing techniques in networks.

3. SUMMARY

Certain embodiments of the present disclosure are directed to systems and methods that provide synchronizing of edge server code among a plurality of edge servers. In some implementations, systems and methods provision, to a plurality of edge servers, an updated version of transform code adapted to perform real-time processing on real-time streaming data that are received by the plurality of edge servers, receive real-time transformed data from at least one of the plurality of edge servers, detect that the received real-time transformed data from the at least one of the plurality of edge servers was generated using a previous version of transform code and perform one or more transform operations corresponding to the updated version of transform code on the received real-time transformed data, until the received transformed data is in a form consistent with the updated version of provisioned transform code.

Certain embodiments of the present disclosure are directed to an edge server that both collects real-time streaming data from multiple client devices, processes the real-time data in real time and directly pushes the real-time processed data back out to be consumed by the multiple client devices that are subscribers to the edge server. In some examples, an edge server uses a low latency forking approach by processing (e.g., executing transforms against) real-time streaming data from multiple client devices into real-time edge processed data and providing the real-time edge processed data back out to the same or other clients serviced by the same edge server in real-time without sending requests to a central server or fixed site for real-time processing and requiring the central server to push the real-time processed data back down through the network. In certain embodiments, the edge server also forwards real-time streaming data, and/or the edge processed data to the central server so that the central server has a copy of the real-time streaming data and/or the edge processed data and can perform operations on the forwarded data if desired. In some embodiments the edge server receives requests from one or more client devices for the real-time streaming data and/or edge processed data that is processed by the central server and provides the data processed by the central server to one or more requesting client devices.

In certain embodiments a central server acts as a central management system for synchronizing code upgrades on the edge servers. In some embodiments new transforms are downloaded as code to a group of edge servers so that the edge servers can properly handle streaming real-time streaming data that is received by the client devices. In certain embodiments, some transform code is pushed out differently from other transform code. In some embodiments, the central server tracks the transform code version of each edge server and determines if the central server needs to perform a newer transformation on data received from an edge server that is using an older version of the transform code prior to completing an upgrade. In certain embodiments a rolling upgrade of edge servers occurs that allows edge servers to continue processing real-time streaming data as part of a code update to avoid loss of real-time processed data by client devices. In some examples, the central server uses raw cached real-time streaming data provided from multiple edge servers to test different transforms to determine a best transform to provide to a set of edge servers in the network.

In certain embodiments, a method carried out by an edge server of a network includes: receiving real-time streaming data from at least a first client device, processing, within a first time duration that is in real-time, the received real-time streaming data to produce first edge processed data, receiving a request for real-time streaming data from at least a second client device, providing, in real-time, the first edge processed data from the edge server to the requesting second client device and forwarding second edge processed data to a central server for processing. In certain embodiments, the second edge processed data is different from or the same as the first edge processed data.

According to some embodiments, a system for providing real-time streaming data includes an edge server and a storage wherein the edge server is configured to: receive real-time streaming data from at least a first client device, process within a first time duration that is in real-time, the received real-time streaming data to produce first edge processed data and store the first edge processed data in the storage, receive a request for real-time streaming data from at least a second client device and provide in real-time the first edge processed data to the requesting second client device. In certain embodiments the edge server is configured to forward second edge processed data to a central server for processing, the second edge processed date being different from or the same as the first edge processed data.

According to some embodiments, a system for providing real-time streaming data includes an edge server that includes one or more processors and memory that includes executable instructions that when executed by the one or more processors causes the one or more processors to: receive real-time streaming data from a plurality of client devices, process, within a first time duration that is in real-time, the received real-time streaming data to produce first edge processed data and store the first edge processed data in a storage. In certain embodiments the edge server receives a request for real-time streaming data from at least some of the plurality of client devices and broadcasts in real-time, the first edge processed data to the requesting client devices. In some embodiments the edge server forwards second edge processed data to a central server for processing, the second edge processed data being different from or the same as the first edge processed data. In certain embodiments, the edge server receives a request from at least one of the plurality of client devices for non-real-time processing of the real-time streaming data from the central server, obtains the non-real-time processed data from the central server and sends the non-real-time processed data from the central server to the at least one requesting client device.

According to some embodiments, a system for synchronizing edge server code updates includes a central server and a storage wherein the central server is configured to: provision, to a plurality of edge servers, an updated version of transform code adapted to perform real-time processing on real-time streaming data that are received by the plurality of edge servers, receive real-time transformed data from at least one of the plurality of edge servers, detect that the received real-time transformed data from the at least one of the plurality of edge servers was generated using a previous version of transform code and perform one or more transform operations corresponding to the updated version of transform code on the received real-time transformed data, until the received transformed data is in a form consistent with the updated version of provisioned transform code.

Depending upon the embodiment, one or more benefits may be achieved. These benefits and various additional benefits can be fully appreciated with reference to the detailed description and accompanying drawings that follow.

4. BRIEF DESCRIPTION OF THE DRAWINGS

The implementations will be more readily understood in view of the following description when accompanied by the below figures, wherein like reference numerals represent like elements, and wherein.

5. DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Aspects of the subject technology are directed to systems and methods for providing real-time data processing in edge servers of a network. In certain embodiments an edge server receives real-time streaming data from at least a first client device, processes, in real-time, the received real-time streaming data to produce real-time edge processed data; receives a request for real-time streaming data from at least a second client device; and providing in real-time, the real-time edge processed data to the requesting second client device. In some embodiments the edge server forwards the received real-time streaming data and if desired the edge processed data to a server, such as a central server or other server, for processing.

In some embodiments, the edge server receives real-time streaming data, such as location information for each client device, in different formats from multiple client devices, normalizes the data in real-time and broadcasts the normalized real-time streaming data back to the client devices that want the location data of other client devices connected to the edge server. As an example, some types of transforms the edge server provides can be one or more of: alerts for geo-fencing operations, location information (e.g., GPS information) format conversion, data compression of data not forwarded or forwarded to a fixed site, pattern filtering, geo-registration and computing mapping tiles for a map application on the client devices.

In some embodiments, benefits include significant improvements, including for example, lower latency feedback of real-time processed streaming data for client devices using the network resulting in improved network latency and user experience. Real-time edge server processing and pushing out of processed data directly by the edge server back to the client subscribers offers faster results and reduced bandwidth in the network to and from a central server. Also off-loading of processing from a central server improves network efficiency.

In certain embodiments, one or more solutions rooted in computer technology overcome one or more problems specifically arising in the realm of computer technology. Some embodiments are directed to computing platforms that include a worldwide network of geographically dispersed servers and client devices. Some embodiments are directed to computing platforms including client devices, edge servers and other networking devices. In some examples, the computing platforms include virtual servers or virtual machines. In certain examples, the computing platforms include a virtual computing environment that provides an operating system and/or an application server for running one or more containers. For example, a container includes a containerized application. In some examples, one or more containers run on a server or host machine of the computing platform and are associated with particular resources that include CPU, memory, storage, and/or networking capacity.

Figure 1:
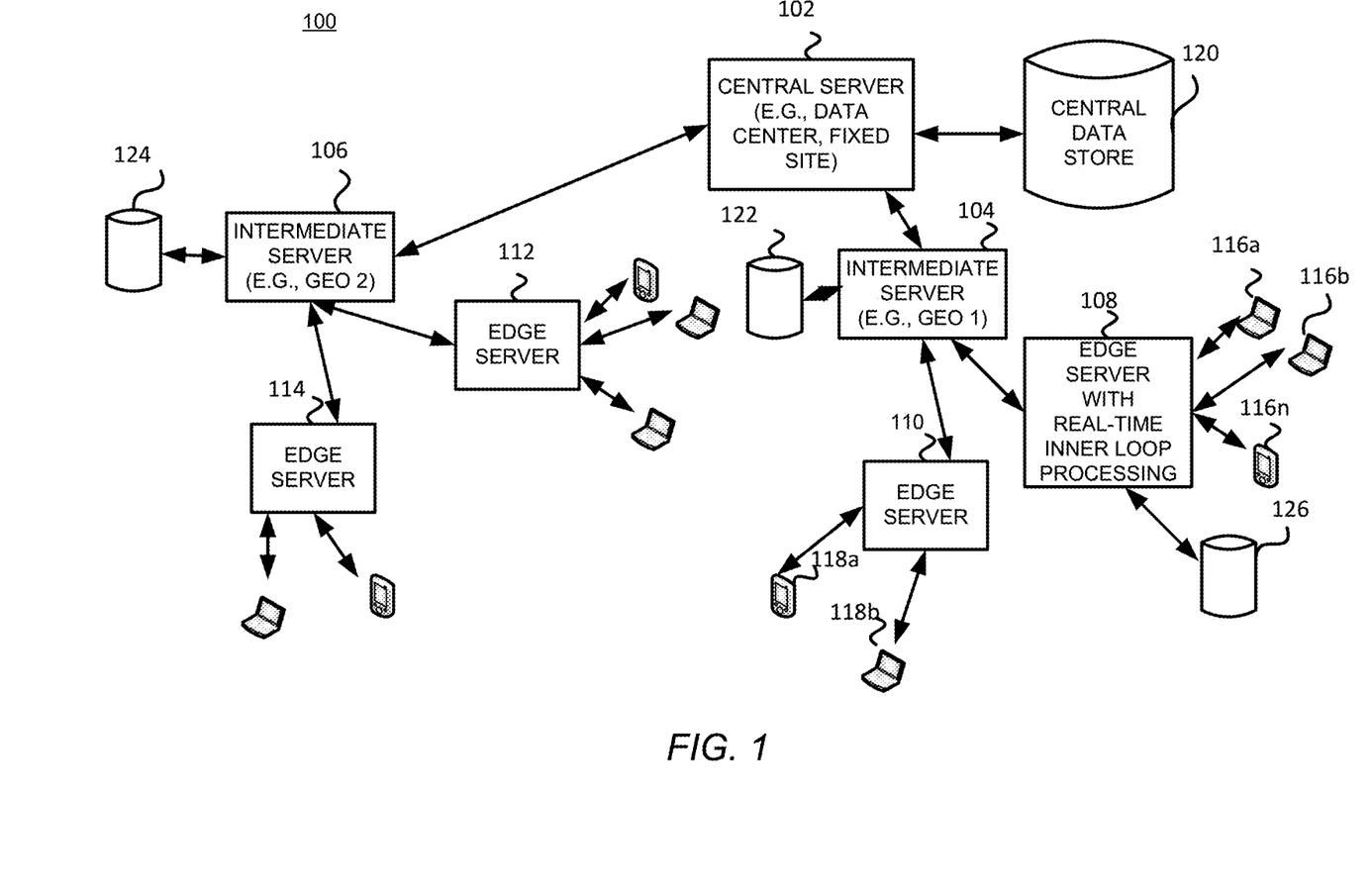
FIG. 1 is a simplified diagram showing a system for providing real-time streaming data according to one example set forth in the disclosure.

FIG. 1 illustrates an example of a system 100 in which techniques described herein may be practiced, according to some embodiments. This diagram is merely an example, which should not unduly limit the scope of the claims. One of ordinary skill in the art would recognize many variations, alternatives and modifications. In the example of FIG. 1, the system 100 is a network of servers that may be employed in different geographic locations. For example, the system 100 in this example includes a central server 102, a plurality of intermediate servers 104 and 106 that may be in different geographic locations such as in different states, cities, countries or any other suitable geographic regions. Each of the intermediate servers 104 are in communication with their respective edge servers 108, 110, 112 and 114 and the central server 102, also referred to as a fixed site or data center. The edge servers 108, 110, 112 and 114 are at the edge of the network. Each of the edge servers 108, 110, 112 and 114 are in communication wirelessly with respective client devices that are in range of the edge servers. In this example, edge server 108 communicates with a plurality of client devices 116a-116n whereas edge server 110 is in communication with other client devices 118a, 118b such that each edge server serves geographically positioned client devices in a particular geographic region. Client devices 116a-116n and other client devices may be any suitable device such as laptop computers, tablets, wearables, or any other wireless or wired devices as desired. Also, there may be multiple layers of intermediate servers if desired.

The central server 102 in this example serves as a data center, fixed site or other system that receives data from each of the edge servers through respective intermediate servers and stores the data in a central data store 120. The central server 102 can also perform real-time processing or non-real-time processing on data received through the edge servers. Intermediate server 104, 106 also have respective data stores 122 and 124 such as databases that store data from multiple edge servers that they support, and they also perform processing on data received from the edge servers as desired. In some examples, each edge server also has a respective storage 126 to store real-time streaming data received from the client devices 116a-116n as well as executable instructions that are executed by one or more processors in the edge server, edge processed data that is produced by the edge server and cache data received from the central server or other server.

By way of illustration only, the system 100 will be described as a system that processes geo-temporal data from the various client devices to the edge server back to the central server. Geo-temporal data includes, for example, location data of the client devices including one or more of speed, altitude, time and location information in any suitable format. In one example, the system 100 provides map tiles that are stored on different tile servers such as an edge server, intermediate server or central server or other suitable servers. A client device may include a map application that executes on the client device that receives the various map tiles wherein a tile may store a portion of a map at a given zoom level. However, the network and client devices may employ any suitable operations.

Figure 5:
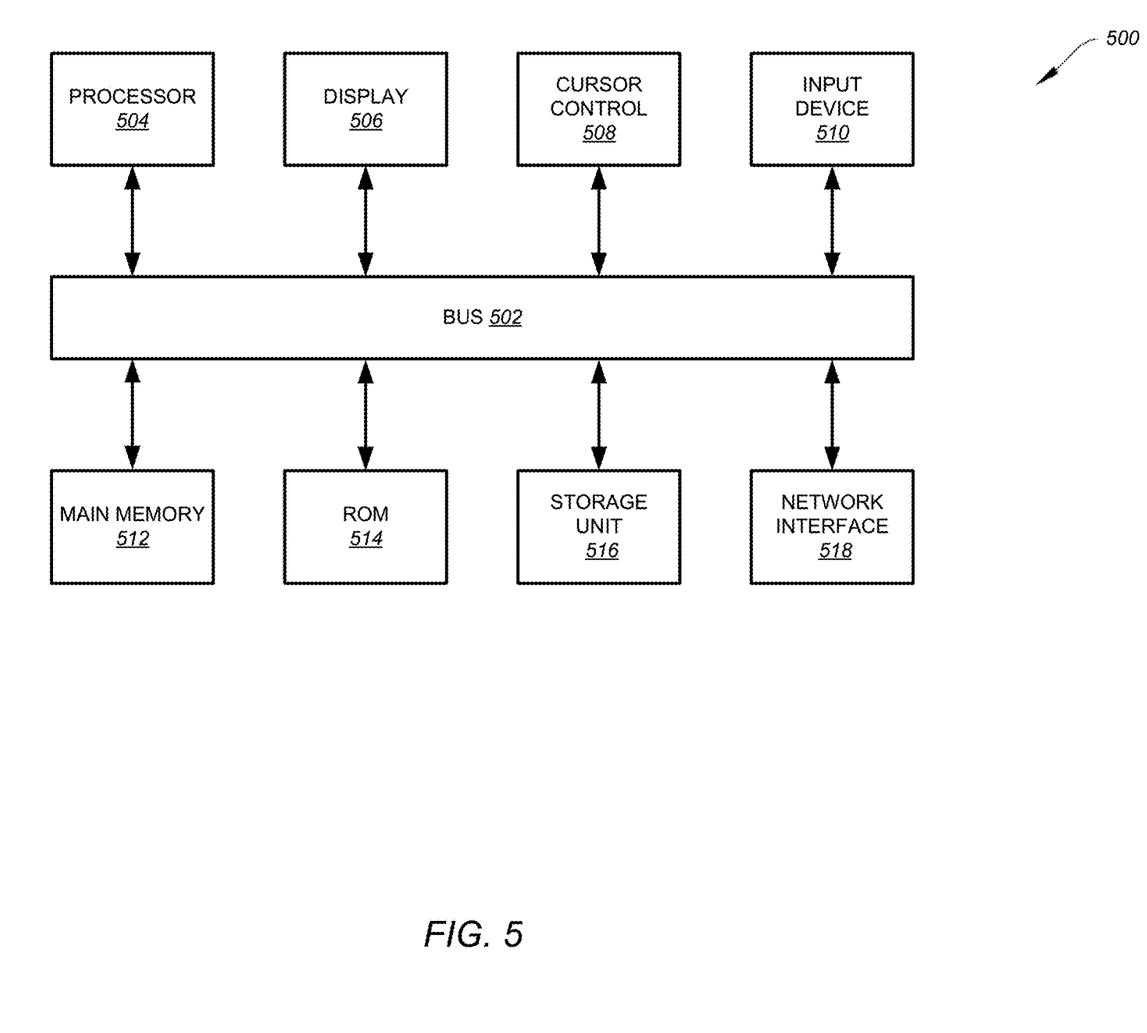
FIG. 5 is a simplified diagram showing a computing system for implementing a system for providing real-time streaming data or for synchronizing edge server code updates according to one or more one examples set forth in the disclosure.

The system 100 is a computer system programmed to perform operations on real-time streaming data that is received from the various client devices. Components of FIG. 1 are implemented at least partially by hardware on one or more computing devices (one example is shown in FIG. 5 below) such as one or more hardware processors executing stored program instructions stored in one or more memories for performing the functions that are described herein. In other words, the functions described herein are intended to indicate operations that are performed using hardware and programming in a special-purpose computer or general-purpose computer, in various embodiments. It will be recognized that the arrangements described herein may be modified as well as the division of work between the various components depending upon desired arrangements.

Each of the edge servers 108, 110, 112 and 114 are configured to receive real-time streaming data from one or more respective client devices and process, in real-time, the received real-time streaming data to produce edge processed data. Real-time processing includes processing that allows real time input data to be processed and provided back (e.g., in milliseconds not seconds) to client devices so that it is available nearly instantaneously as feedback.

As an example, real time processing by an edge server captures, processes and responds to data as the events generating that data are happening in the real world. The edge processed data can be stored in the storage 126. Taking edge server 108 as an example, the edge server 108 is configured to receive a request from the client devices 116a-166n for real-time streaming data relating to other client devices that are being served by the same edge server. The edge server 108 provides in real-time the edge processed data back to the requesting client devices. For example, client device 116a-116n may continuously provide real-time location data to the edge server 108. Client device 116a may wish to track the location of client device 116b which is in the same subscriber group since the clients 116a-116n are all connected to the edge server 108. The edge server provides, in real-time edge processed data relating, for example, to client device 116b to 116a through a broadcast message or through a non-broadcast message if desired. As such, the edge server 108 not only collects real-time streaming data from multiple client devices but also processes the data in real-time, such as converting the location information that may be in a grid reference format to a latitude and longitude format as part of a transform operation and provides the edge processed data directly back to t the client devices that are being served by the edge server. The edge server 108 also forwards the edge processed data and/or the raw real-time streaming data to the central server 102 for processing and storage if desired. This forking process allows the edge server 108 to not just act as a repeater device of data from the central server, but to provide real time processed data directly out to the client devices it servers while also passing on real time streaming data and edge processed data out to the central server. This can reduce real time communication and bandwidth requirements normally needed by prior systems that used the central server to provide real-time processed data to the edge servers.

In another example, the transform(s) carried out by the edge server may be a geo-registration operation wherein a coarse location is provided by the client devices and a more accurate location determination for client devices is made by the edge server. The processed information which is the more accurate location information can then be sent back to the other client devices in the group so that the varying client devices connected to the same edge server can more accurately track locations of one another in real-time. Other transformation operations as described herein may also be employed. Any other suitable transformations may also be used. In some examples, the storage 126 serves as a cache for the raw real-time streaming data as well as storage of the edge processed data.

Figure 2:
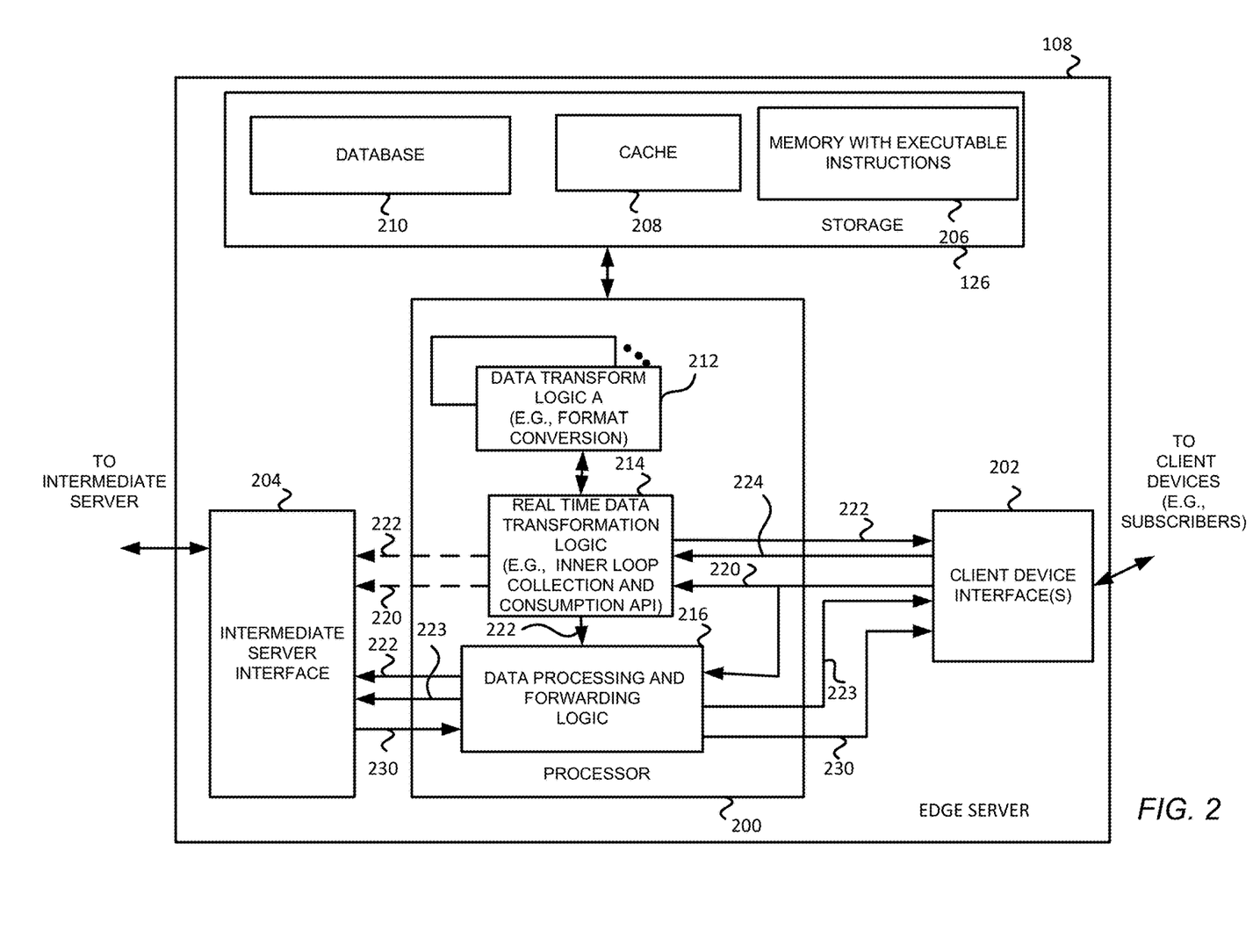
FIG. 2 is a simplified block diagram showing an edge server for providing real-time streaming data according to one example set forth in the disclosure.

FIG. 2 is a block diagram illustrating in more detail an example of the edge server 108. This diagram is merely an example, which should not unduly limit the scope of the claims. One of ordinary skill in the art would recognize many variations, alternatives, and modifications. The edge server 108 includes one or more processors 200 as well as a client interface 202 and an intermediate server interface 204 to allow the edge server 108 to communicate with the multiple respective clients as well as the intermediate server 104 to which it hierarchically communicates. The interfaces 202 and 204 may be any suitable network interfaces including wired and/or wireless communication interfaces as desired. The storage 126 may include differing types of memory suitably connected to the processor 200 and in this example includes memory 206 that stores executable instructions that when executed by the one or more processors 200 cause the processor 200 to operate as described herein. The storage 126 may also have cache memory 208 which may be a fast access cache to allow real-time storage and retrieval of information. In some examples, the storage 126 also includes memory configured as database 210 that may be used to track the client devices as desired by the edge server. The storage 126 may be any combination of any suitable memory systems that include ROM, RAM, distributed memory, or other memory in any desired form.

The edge server 108 includes data transformation logic 212, real-time data transformation logic 214 and data processing and forwarding logic 216. The data transformation logic 212, the real-time data transformation logic 214 and data processing and forwarding logic 216 may be include executable code stored in memory and/or executing by the processor 200 and implemented as one or more applications, APIs, or any other suitable executable code that is shown as executing on the processor 200 to carry out operations described herein. In one example, the memory 206 may store an operating system, applications, APIs, other executable code as desired and executable code that when executed by the processor 200 produces the transform logic 212, real time data transformation logic 214 and data processing and forwarding logic 216 as described below. In some examples, the data transform logic 212 provides the transform operations to be employed by the real time data transformation logic 214 to cause the processor 200 to carry out any suitable real-time transformations on the real-time streaming data. In certain examples, the data processing and forwarding logic 216 is configured to perform additional real-time processing using the real-time edge processed data from the real time data transformation logic 214 and/or non-real time processing on the real-time edge processed data from the real time data transformation logic 214 and/or forward the real-time edge processed data from the real time data transformation logic 214 to the central server. It will be recognized that the operations described with respect to the data transformation logic 212, real-time data transformation logic 214 and data processing and forwarding logic 216 can be suitable combined or varied across logic in any suitable manner.

Figure 3:
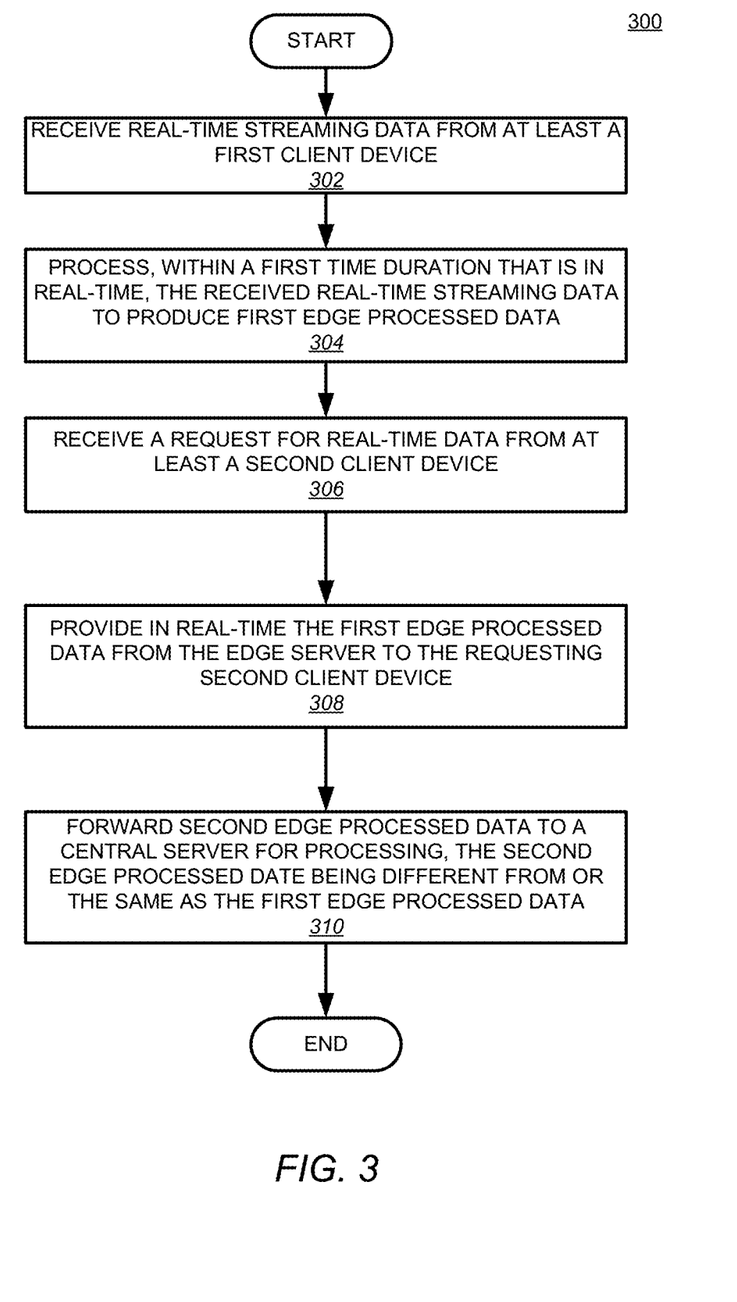
FIG. 3 is a flow chart showing a method for providing real-time streaming data according to one example set forth in the disclosure.

Referring also to FIG. 3, one example of a method 300 for providing real-time data is shown as carried out by the edge server 108. This diagram is merely an example, which should not unduly limit the scope of the claims. One of ordinary skill in the art would recognize many variations, alternatives, and modifications. As shown in block 302, the method includes receiving real-time streaming data from at least a first client device. In this example, the real-time streaming data 220 is coming from client device 116a. As shown in block 304, the method includes processing, within a first time duration that is in real-time, the received real-time streaming data 220 to produce first edge processed data 222. In this example, the first time duration may be, for example, between 50-200 milliseconds. However, any suitable real-time duration may be employed and depends upon the time duration needed to complete the transformation being done. In some implementations, the edge server 108 processes data in real-time as part of an inner loop process whereas the central server or intermediate server process data as part of a slower outer loop processing operation. The inner loop operation may be in multiple stages with the same or differing time durations. In one example, the first time duration is in real-time and a second time duration of an inner loop processing operation in the edge server is in real-time or non-real time. Edge processed data 223 from the second time duration can also be sent out to clients directly from the edge server and/or sent up to the central server for storage and further processing.

In some examples, the real-time data transformation logic 214 processes the real-time streaming data 220 in real-time by transforming the data to a different format from the format of the data received as the real-time streaming data. As such, a format conversion operation is carried out in real-time as part of an inner loop operation. As shown in block 306, the method includes receiving a request 224 for real-time data from at least a second client device, in this example, device 116b. The first edge processed data 222 in this example is stored in the cache 208 so that upon receipt of a request by another client device for that data, the edge server 108, as shown in block 308 provides in real-time the edge processed data 222 to the requesting client device 116b.

As shown in block 310, the method also includes forwarding edge processed data 222 to the central server for processing (including storage if desired). In this example, the real-time edge processed data 222 is obtained by the data processing and forwarding logic 216 and may be forwarded without further processing to the central server via the intermediate server interface 204 or may undergo further processing, either real-time processing or non-real time processing, as part of a second time duration processing operation that produces edge processed data 223 and then can be forwarded to the central server through the intermediate server. In certain examples, the edge processed data 223 from the data processing and forwarding logic 216 is provided back to a client or clients requesting the data.

In another example, the real-time data transformation logic 214 provides the edge processed data 222 directly to the intermediate server through the intermediate server interface 204 as represented by the dashed line. As part of an outer loop processing, the central server or intermediate server can provide additional longer-term processing of the data such as a search operation or other non-real-time operation and provide the resulting processed data indicated as 230 back to the edge server for output to whichever client requested the data.

By way of illustrative example only, and not limitation, in one example the real-time data transformation logic 214 and data processing and forwarding logic 216 may be configured as a data pipeline. In one example, the real-time data transformation logic 214 employs Apache Kafka and the data processing and forwarding logic 216 employs Apache Flink such that real-time streaming data in the form of streams are pushed to Kafka which is part of the real-time data transformation logic 214 that carries out a desired real-time transform on the real-time streaming data 220. In some examples, the real-time data transformation logic 214 calls data transform logic 212 to provide an appropriate transform on the real-time data 220. There may be multiple different transforms available to call depending on the type of data transformation logic 212 available. As shown, different transforms may be carried out by the edge server 108 depending upon the application being used by the client devices. For example, if a client device is using a map application, a get_live request may be sent by the client device to get live data of all other client devices in a geographic area, namely the other client devices that are connected to the same edge server, in this example. The real-time data transformation logic 214 may then carry out the appropriate transform on the real-time streaming data 220 such as format conversion of location data or any other suitable transform operation. As such, in a first time duration, the resulting edge processed data 222 is stored in the cache and can be submitted back out to other clients in a broadcast message if desired.

In certain examples, the data processing and forwarding logic 216 employs an Apache Flink operation, such as a windowed computation operation, on the edge processed data 222 (also referred to as first edge processed data) provided from the real-time data transformation logic 214 to provide additional real-time processing on the real time edge processed data 222 to produce additional edge processed data 223 (also referred to as second edge processed data). The length of the windowed processing will determine whether the operation is able to be performed on a real-time basis. The additional edge processed data 223, edge processed data 222 or raw received streaming real-time data 220 can be sent to a central server which then may operate a search based on a request from the client in a non-real-time operation. For example, processing by the data processing and forwarding logic 216 with another time duration such as performing windowed processing through Apache Flink can be provided by the edge server 108 to produce second edged processed data 223 which in one example is a longer time duration such as 500 milliseconds than the first time duration. However, it can be the same time duration length as well and may also be done in real-time.

In another example, the second time duration is a non-real-time duration such as a 5 second window or any other suitable non-real-time length. As such, the edge server 108 not only provides real-time edge processed data 222 (and additional edge processed data 223) back out to clients but may also provide other data processing and forwarding of the additional edge processed data 223 to the central server via the intermediate server for longer term processing operations.

The edge server 108 as such receives real-time streaming data 220 from multiple client devices and processes, within the first time duration that is in real-time, the received real-time streaming data from client devices to produce edge processed data 222 and/or 223 from multiple client devices and broadcasts the edge processed data to multiple client devices in real-time. For example, client devices 116a-116n receive a broadcast message and display the current locations of client devices 116a-116n on a map, for example, to get real-time positioning information of the other client devices 116a-116n. Each client device can ignore their own location data in the broadcast message or display it if desired. The real-time data transformation logic 214 in one example, processes (e.g., transforms) the real-time streaming data 220 in a first time duration that is in real-time and caches the transformed real-time edge processed data 222 in cache 208. The real-time edge processed data 222 data may be made available through the data pipeline for the data processing and forwarding logic 216 to perform second time duration processing and uses the transformed data 222 from the real-time transformation logic 214 as input to a windowed compute operation such as carried out by an Apache Flink based operation, to produce the second edge processed data 223. The data processing and forwarding logic 216 provides the second edge processed data 223 from the edge server to the requesting client device through the client device interface 202 and/or to the central server through the intermediate server interface.

In some implementations, the received real-time streaming data 220 is in a format from a client device that is different from a format that is needed by another client device such that processing by the edge server 108 includes normalizing the data in real-time by converting from one format to another format through the real-time data transformation logic 214. The normalized data, which is edge processed data 222, is broadcast in real-time to the requesting client device or devices.

In some embodiments, the data transformation logic 212 includes differing transformation capabilities so that real-time processing can include generating alerts for geofencing operations associated with the client devices. In one example, instead of the central server determining whether a client device has gone outside of a geofence, the edge server makes the determination by carrying out the geofencing operations normally carried out by the central server. As such, the central server can download differing transformation logic in the form of code updates to edge servers across the network to improve efficiency of the network.

In another example, the real-time data transformation logic 214 performs data compression on the real-time streaming data prior to storage in the cache 208 and/or prior to sending the real-time streaming data to the central server or intermediate server. In yet another example, the processing includes pattern filtering on the real-time streaming data such that the edge server evaluates patterns of real-time data such as location filtering or any other suitable pattern filtering that would normally be carried out for example, by the central server. In another example, the processing includes a geo-registration operation based on the real-time streaming data such that the edge server refines coarse geographic location information received from the client devices. In yet another example, the edge server computes mapping tiles for the client devices instead of the client device having to get mapping tiles from differing servers in the network thereby speeding up the visual mapping of a map application executing on the client device. One or more processing transforms may be employed by an edge server as well as any other suitable real-time transformation operations as desired and the resulting edge processed data 222 is provided back to the requesting client device or devices.

In another example, the edge server 108 receives the real-time streaming data from a plurality of client devices, processes, within a first time duration as in real-time, the received real-time streaming data to produce edge processed data 222 and stores the edge processed data 222 in storage 126, in this example in cache 208. The edge server 108 receives a request for real-time data from at least some of the plurality of client devices 116a-116n and broadcasts in real-time, the edge processed data 222 to the requesting client devices. In one example, the edge server 108 through the data processing and forwarding logic 216 forwards edge processed data 222 or 223 to the central server 102 through intermediate server 104. The edge processed data can be the same as the edge processed data 222 or can be further processed and be the edge processed data 223. The edge server 108 may also receive requests from one or more client devices for non-real-time processing of the real-time streaming data such as a client requesting a search to be performed that may be carried out, for example, by a search request processing operation which in this example involves the central server carrying out the requested search as part of an outer loop operation since the search need not be carried out in real-time. The edge server 108 obtains the non-real-time processed data 230 from the central server 102 then provides the non-real-time processed data 230 to the client that requested the non-real-time processed data.

Figure 4:
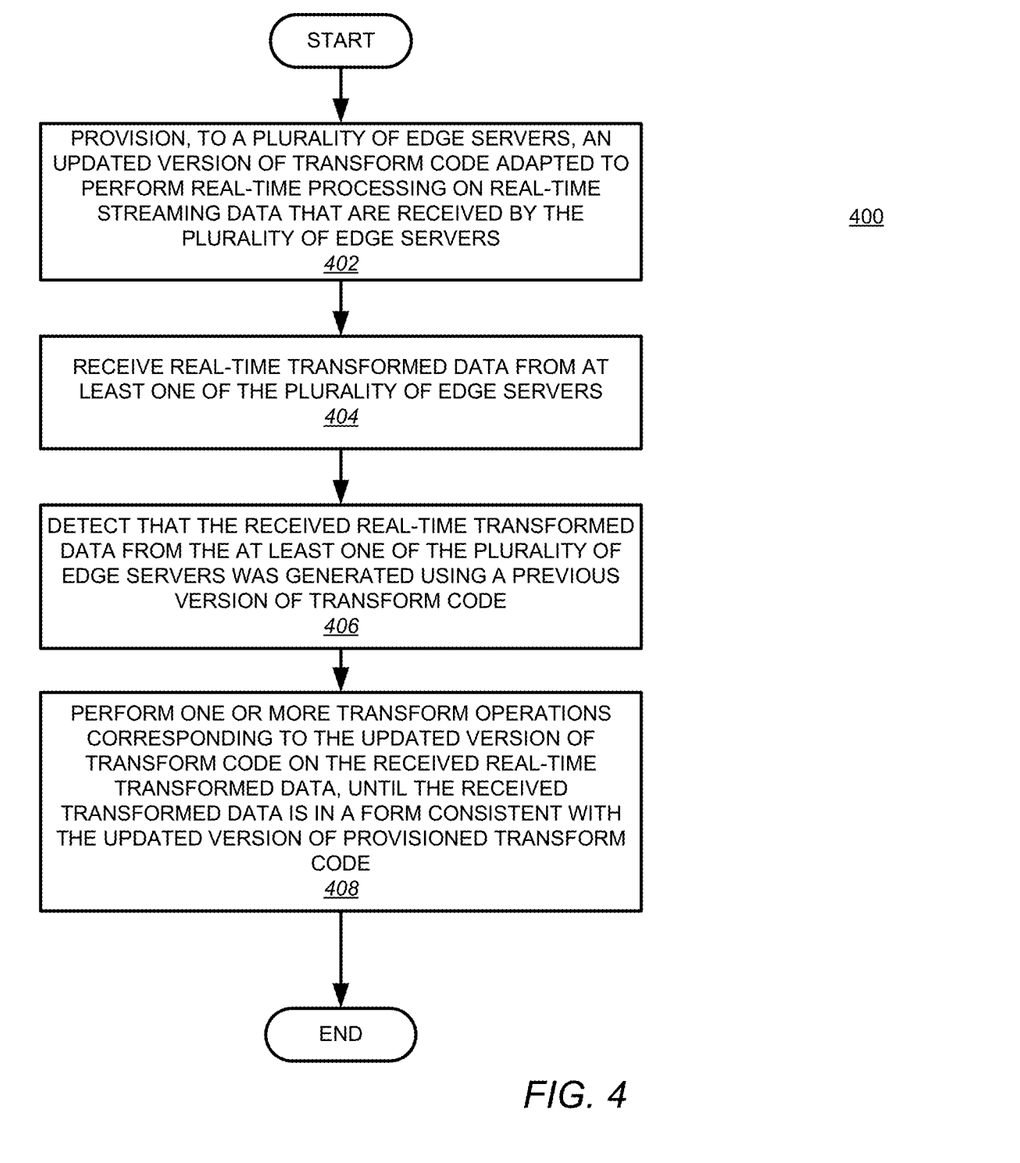
FIG. 4 is a flow chart showing a method for synchronizing edge server code updates according to one example set forth in the disclosure.

FIG. 4 is a block diagram illustrating a method for synchronizing edge server code updates 400. This diagram is merely an example, which should not unduly limit the scope of the claims. One of ordinary skill in the art would recognize many variations, alternatives, and modifications. The method in one example is carried out by the central server 102. The central server 102 serves as a type of edge server management system. However, any suitable server or other system may be employed. As shown in block 402, the method includes provisioning, to a plurality of edge servers 108, 110, 112 and 114, an updated version of transform code such as the code that when executed, serves as the transform logic 212, that is adapted to perform real-time processing on real-time streaming data. The updated version of the transform code is received by the plurality of edge servers. As shown in block 404, the central server receives real-time transform data from at least one of the plurality of edge servers 108, 110, 112 and 114. As shown in block 406, the method includes detecting by the central server, for example, that the received real-time transform data that was provided by one of the edge servers was generated using a previous version of transformed code. This is done, for example, by the central server maintaining a database with each of the edge servers and their current code version numbers. When the provisioned updated version has not been indicated as being installed by an edge server, the central server recognizes that the received transform data came from an edge server that used the previous version of the transform code. Any other suitable tracking mechanism may also be employed. As shown in block 408, the method includes the central server performing one or more transform operations corresponding to the updated version of the transform code on the received real-time transform data, until the received transform data is in a form consistent with the updated version of the provisioned transform code. By way of example, when the central server receives edge processed data 222 that was generated by an edge server having an improper version number, the central server performs that appropriate transform on the raw data that it had received and performs the transform operation until the edge server is fully updated. This facilitates the type of synchronized rollout of transform code. In one example, it is desirable that all edge servers have the same transform capabilities and hence the same version of the transform code.

In another example, the central server 102 has a replication of all the raw streaming data received by each of the edges and runs back testing operations on transform code that is being developed by developers to determine the best transform code to deploy for a given geographic location or desired operations from clients in differing locations.

FIG. 5 is a simplified diagram showing a computing system for implementing an edge server, central server, intermediate server and/or a client device and/or a data recipient device. However, any suitable structure may be employed for the various components of FIG. 1. This diagram is merely an example, which should not unduly limit the scope of the claims. One of ordinary skill in the art would recognize many variations, alternatives, and modifications. The computing system 500 includes a bus 502 or other communication mechanism for communicating information, a processor 504, a display 506, a cursor control component 508, an input device 510, a main memory 512, a read only memory (ROM) 514, a storage unit 516, and a network interface 518. In some embodiments, some or all processes (e.g., steps) of the method 400, the method 500, and/or the method 600 are performed by the computing system 500. In some examples, the bus 502 is coupled to the processor 504, the display 506, the cursor control component 507, the input device 510, the main memory 512, the read only memory (ROM) 514, the storage unit 516, and/or the network interface 518. In certain examples, the network interface is coupled to network elements such as servers and if desired, client devices. For example, the processor 504 includes one or more general purpose microprocessors. In some examples, the main memory 512 (e.g., random access memory (RAM), cache and/or other dynamic storage devices) is configured to store information and instructions to be executed by the processor 504. In certain examples, the main memory 512 is configured to store temporary variables or other intermediate information during execution of instructions to be executed by processor 504. For examples, the instructions, when stored in the storage unit 516 accessible to processor 504, render the computing system 500 into a special-purpose machine that is customized to perform the operations specified in the instructions. In some examples, the ROM 514 is configured to store static information and instructions for the processor 504. In certain examples, the storage unit 516 (e.g., a magnetic disk, optical disk, or flash drive) is configured to store information and instructions.

In some embodiments, the display 506 (e.g., a cathode ray tube (CRT), an LCD display, or a touch screen) is configured to display information to a user of the computing system 500. In some examples, the input device 510 (e.g., alphanumeric and other keys) is configured to communicate information and commands to the processor 504. For example, the cursor control 508 (e.g., a mouse, a trackball, or cursor direction keys) is configured to communicate additional information and commands (e.g., to control cursor movements on the display 506) to the processor 504.

In some embodiments, the system 100 includes a cloud computing platform that allows the one or more device clients access to remote servers, data storages, networks, devices, applications and/or data resources over the network. For example, multiple users through the one or more client devices store data at the data storages of the cloud computing platform. In other examples, the system 100 is associated with a platform provider that provides the platform to multiple customers. For example, customers of the computing platform 103 include individuals, organizations and/or commercial companies.

In certain embodiments, the one or more servers are divided into in one or more regions. For example, a region represents a geographic area that the one or more servers or host machines are located within. As an example, each region relates to a different geographic area. In other examples, each region of the one or more servers or host machines includes one or more separate zones. For example, each server or host machine within a region is associated with only one zone of the one or more separate zones associated with the region. As an example, each zone within a region are isolated from any other zone within the region. In one example, each zone within a region is connected with any other zone within the region through low-latency links. In some examples, the system is configured to not replicate applications and/or resources across different regions. For example, each region is completely independent from any other region of the system.

According to some embodiments, the system includes a container-orchestration platform. In some examples, the container-orchestration platform allows for automated deployment, scaling and/or operations of containers across the platform. For example, the container-orchestration platform employs the containers across one or more instances of the system.

According to certain embodiments, a container of the system includes one or more applications. In some examples, the container also includes data and libraries associated with the one or more applications. For example, the container allows the one and more applications and their associated data and libraries to be co-located on the same server or host machine. In one example, the container allows the one and more applications and their associated data and libraries to share resources. For example, the shared resources include CPU, memory, storage, and/or networking capacity. As an example, the container represents the lowest level of a micro-service of the computing platform 103. In one example, the micro-service includes the one or more applications, libraries and the applications' dependencies.

In some embodiments, some or all processes (e.g., steps) of the method 300 are performed by the system 100. In certain examples, some or all processes (e.g., steps) of the method 300 are performed by a computer and/or a processor directed by a code. For example, a computer includes a server computer and/or a client computer (e.g., a personal computer). In some examples, some or all processes (e.g., steps) of the method 300 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, some or all processes (e.g., steps) of the method 400 are performed by the system 100. In certain examples, some or all processes (e.g., steps) of the method 400 are performed by a computer and/or a processor directed by a code. For example, a computer includes a server computer and/or a client computer (e.g., a personal computer). In some examples, some or all processes (e.g., steps) of the method 500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, a method for providing real-time streaming data, carried out by an edge server of a network includes receiving real-time streaming data from at least a first client device, processing, within a first time duration that is in real-time, the received real-time streaming data to produce first edge processed data, receiving a request for real-time streaming data from at least a second client device, and providing, in real-time, the first edge processed data from the edge server to the requesting second client device. The method may also include forwarding second edge processed data to a central server for processing. In certain embodiments, the second edge processed data is different from or the same as the first edge processed data. For example, the method is implemented according to at least FIG. 1, FIG. 2, FIG. 3 and/or FIG. 5.

In certain examples, the method includes processing, within a second time duration, the received real-time streaming data to produce the second edge processed data, the second time duration being longer than or equal to the first time duration.

In some examples the method further includes receiving real-time streaming data from the at least the second client device and processing, within the first time duration that is in real-time, the received real-time streaming data from the second client device to produce the first edge processed data from real-time streaming data from both the at least first and second client devices. The method also includes broadcasting the first edge processed data to the at least first and second client device in real-time.

In certain examples, the method further includes processing, within the first time duration that is in real-time comprises transforming the real-time streaming data and caching the transformed data and processing within the second time duration by using the transformed data as input to a windowed compute operation to produce the second edge processed data. In some examples the method further includes providing the second edge processed data from the edge server to the requesting second client device.

In some examples the received real-time streaming data is in a format different from a format needed by the second client device and the method includes processing the received real-time streaming data by normalizing the data in real-time and providing, in real-time, the first edge processed data from the edge server to the requesting second client device by broadcasting the normalized real-time streaming data to the second client device.

In certain examples, the method includes processing the received real-time streaming data by performing one or more of: generating alerts for geo-fencing operations associated with the first and second client devices, format conversion of location information received from the first and second client devices, data compression on the real-time streaming data, pattern filtering on the real-time streaming data, geo registration based on the real-time streaming data and computing mapping tiles for the first and second client devices.

According to certain embodiments, a system for providing real-time streaming data includes an edge server and a storage wherein the edge server is configured to: receive real-time streaming data from at least a first client device, process within a first time duration that is in real-time, the received real-time streaming data to produce first edge processed data and store the first edge processed data in the storage, receive a request for real-time streaming data from at least a second client device and provide in real-time the first edge processed data to the requesting second client device. In certain embodiments the edge server is configured to forward second edge processed data to a central server for processing, the second edge processed date being different from or the same as the first edge processed data. For example, the system is implemented according to at least FIG. 1, FIG. 2, FIG. 3 and/or FIG. 5.

In certain examples, the edge server is further configured to process, within a second time duration, the received real-time streaming data to produce the second edge processed data, the second time duration being longer than or equal to the first time duration.

In some examples, the edge server is configured to: receive real-time streaming data from the at least the second client device; process, within the first time duration that is in real-time, the received real-time streaming data from the second client device to produce the first edge processed data from real-time streaming data from both the at least first and second client devices; and broadcast the first edge processed data to the at least first and second client device in real-time.

In certain examples, the edge server is configured to process the real-time streaming data, within the first time duration that is in real-time by transforming the real-time streaming data and caching the transformed data and process within the second time duration by using the transformed data as input to a windowed compute operation to produce the second edge processed data. In some examples, the edge server is configured to provide the second edge processed data from the edge server to the requesting second client device.

In certain examples, the received real-time streaming data is in a format different from a format needed by the second client device and the edge server is configured to process the received real-time streaming data by normalizing the data in real-time and provide, in real-time, the first edge processed data from the edge server to the requesting second client device by broadcasting the normalized real-time streaming data to the second client device.

In some examples, the edge server is configured to process the received real-time streaming data by performing one or more of: generating alerts for geo-fencing operations associated with the first and second client devices, format conversion of location information received from the first and second client devices, data compression on the real-time streaming data, pattern filtering on the real-time streaming data, geo registration based on the real-time streaming data and computing mapping tiles for the first and second client devices.

According to certain embodiments, a system for providing real-time streaming data includes an edge server that includes one or more processors and memory that includes executable instructions that when executed by the one or more processors causes the one or more processors to: receive real-time streaming data from a plurality of client devices, process, within a first time duration that is in real-time, the received real-time streaming data to produce first edge processed data and store the first edge processed data in a storage. In certain embodiments the edge server receives a request for real-time streaming data from at least some of the plurality of client devices and broadcasts in real-time, the first edge processed data to the requesting client devices. In some embodiments the edge server forwards second edge processed data to a central server for processing, the second edge processed data being different from or the same as the first edge processed data. In certain embodiments, the edge server receives a request from at least one of the plurality of client devices for non-real-time processing of the real-time streaming data from the central server, obtains the non-real-time processed data from the central server and sends the non-real-time processed data from the central server to the at least one requesting client device. For example, the system is implemented according to at least FIG. 1, FIG. 2, FIG. 3 and/or FIG. 5.

In certain examples, the memory includes executable instructions that when executed by the one or more processors causes the edge server to process, within a second time duration, the received real-time streaming data to produce the second edge processed data, the second time duration being longer than or equal to the first time duration.

In some examples, the memory includes executable instructions that when executed by the one or more processors causes the edge server to process, within the first time duration that is in real-time by transforming the real-time streaming data and caching the transformed data and process within the second time duration by using the transformed data as input to a windowed compute operation to produce the second edge processed data.

In certain embodiments, the memory includes executable instructions that when executed by the one or more processors causes the edge server to provide the second edge processed data from the edge server to one or more requesting client devices of the plurality of client devices.

In some embodiments, the received real-time streaming data is in a format different from a format needed by other client devices and the memory includes executable instructions that when executed by the one or more processors causes the edge server to process the received real-time streaming data by normalizing the data in real-time and provide, in real-time, the first edge processed data from the edge server to one or more requesting client devices by broadcasting the normalized real-time streaming data to the plurality of client devices.

In certain embodiments, the memory includes executable instructions that when executed by the one or more processors causes the edge server to process the received real-time streaming data by performing one or more of: generating alerts for geo-fencing operations associated with the first and second client devices, format conversion of location information received from the first and second client devices, data compression on the real-time streaming data, pattern filtering on the real-time streaming data, geo registration based on the real-time streaming data and computing mapping tiles for the first and second client devices.

In other embodiments a system for synchronizing edge server code updates includes a central server and a storage wherein the central server is configured to: provision, to a plurality of edge servers, an updated version of transform code adapted to perform real-time processing on real-time streaming data that are received by the plurality of edge servers, receive real-time transformed data from at least one of the plurality of edge servers, detect that the received real-time transformed data from the at least one of the plurality of edge servers was generated using a previous version of transform code and perform one or more transform operations corresponding to the updated version of transform code on the received real-time transformed data, until the received transformed data is in a form consistent with the updated version of provisioned transform code. For example, the system is implemented according to at least FIG. 1, FIG. 2, FIG. 3, FIG. 4 and/or FIG. 5.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations, one or more features from a combination can in some cases be removed from the combination, and a combination may, for example, be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for synchronizing edge server code among a plurality of edge servers comprising:
   provisioning, to a plurality of edge servers, an updated version of transform code adapted to perform real-time processing on real-time streaming data that are received by the plurality of edge servers;
   receiving real-time transformed data from at least one of the plurality of edge servers;
   detecting that the received real-time transformed data from the at least one of the plurality of edge servers was generated using a previous version of transform code; and
   performing one or more transform operations corresponding to the updated version of transform code on the received real-time transformed data, until the received transformed data is in a form consistent with the updated version of provisioned transform code;
   wherein the method is performed using one or more processors of a central server.

2. The method of claim 1 comprising tracking a transform code version of each of the plurality of edge servers and determining whether to perform a newer transformation on the real-time transformed data received from an edge server that is using an older version of the transform code prior to completing an upgrade.

3. The method of claim 1 comprising using raw cached real-time streaming data provided from multiple edge servers and testing different transforms to determine a best transform to provide to a set of edge servers in the network.

4. A central server for synchronizing edge server code comprising:
   one or more processors;
   memory comprising executable instructions that when executed by the one or more processors causes the one or more processors to:
      provision, to a plurality of edge servers, an updated version of transform code adapted to perform real-time processing on real-time streaming data that are received by the plurality of edge servers;
      receive real-time transformed data from at least one of the plurality of edge servers;
      detect that the received real-time transformed data from the at least one of the plurality of edge servers was generated using a previous version of transform code; and
      perform one or more transform operations corresponding to the updated version of transform code on the received real-time transformed data, until the received transformed data is in a form consistent with the updated version of provisioned transform code.

5. The central server of claim 4 wherein the memory comprises instructions that when executed by the one or more processors causes the one or more processors to track a transform code version of each of the plurality of edge servers and determine whether to perform a newer transformation on the real-time transformed data received from an edge server that is using an older version of the transform code prior to completing an upgrade.

6. The central server of claim 4 wherein the memory comprises instructions that when executed by the one or more processors causes the one or more processors to use raw cached real-time streaming data provided from multiple edge servers and test different transforms to determine a best transform to provide to a set of edge servers in the network.

7. A system for providing real-time streaming data, the system comprising:
a plurality of edge servers;
a storage associated with each of the plurality of edge servers;
wherein each of the plurality of edge servers is configured to:
receive real-time streaming data from at least a respective first client device;
process, within a first time duration that is in real-time, the received real-time streaming data to produce first edge processed data;
store the first edge processed data in the respective storage;
receive a request for real-time streaming data from at least a second client device;
provide in real-time the first edge processed data to the requesting second client device; and
forward second edge processed data to a central server for processing, the second edge processed data being different from or the same as the first edge processed data; and
the central server, configured to:
provision, to the plurality of edge servers, an updated version of transform code adapted to perform real-time processing on real-time streaming data that are received by the plurality of edge servers;
receive real-time transformed data from at least one of the plurality of edge servers;
detect that the received real-time transformed data from the at least one of the plurality of edge servers was generated using a previous version of transform code; and
perform one or more transform operations corresponding to the updated version of transform code on the received real-time transformed data, until the received transformed data is in a form consistent with the updated version of provisioned transform code.

8. The system of claim 7 wherein the central server is configured to track a transform code version of each of the plurality of edge servers and determine whether to perform a newer transformation on the real-time transformed data received from an edge server that is using an older version of the transform code prior to completing an upgrade.

9. The system of claim 7 wherein the central server is configured to use raw cached real-time streaming data provided from multiple edge servers and test different transforms to determine a best transform to provide to a set of edge servers in the network.

10. The system of claim 7 wherein at least one of the plurality of edge servers are configured to process, within a second time duration, the received real-time streaming data to produce the second edge processed data, the second time duration being longer than or equal to the first time duration.

11. The system of claim 10 wherein at least one of the plurality of edge servers is configured to:
receive real-time streaming data from the at least the second client device;
process, within the first time duration that is in real-time, the received real-time streaming data from the second client device to produce the first edge processed data from real-time streaming data from both the at least first and second client devices; and
broadcast the first edge processed data to the at least first and second client device in real-time.

12. The system of claim 11 wherein at least one of the plurality of edge servers is configured to process, within the first time duration that is in real-time by transforming the real-time streaming data and caching the transformed data and process within the second time duration by using the transformed data as input to a windowed compute operation to produce the second edge processed data.

13. The system of claim 12 wherein at least one of the edge servers is configured to provide the second edge processed data from the edge server to the requesting second client device.

14. The system of claim 7 wherein the received real-time streaming data is in a format different from a format needed by the second client device and wherein at least one of the edge servers is configured to process the received real-time streaming data by normalizing the data in real-time and provide, in real-time, the first edge processed data from the at least one edge server to the requesting second client device by broadcasting the normalized real-time streaming data to the second client device.

15. The system of claim 7 wherein at least one the edge server is configured to process the received real-time streaming data by performing one or more of: generating alerts for geo-fencing operations associated with the first and second client devices, format conversion of location information received from the first and second client devices, data compression on the real-time streaming data, pattern filtering on the real-time streaming data, geo registration based on the real-time streaming data and computing mapping tiles for the first and second client devices.

* * * * *